Dec. 30, 1941.  B. GUSTAFSON ET AL  2,268,392
PARTITION DEVICE
Filed Feb. 5, 1940
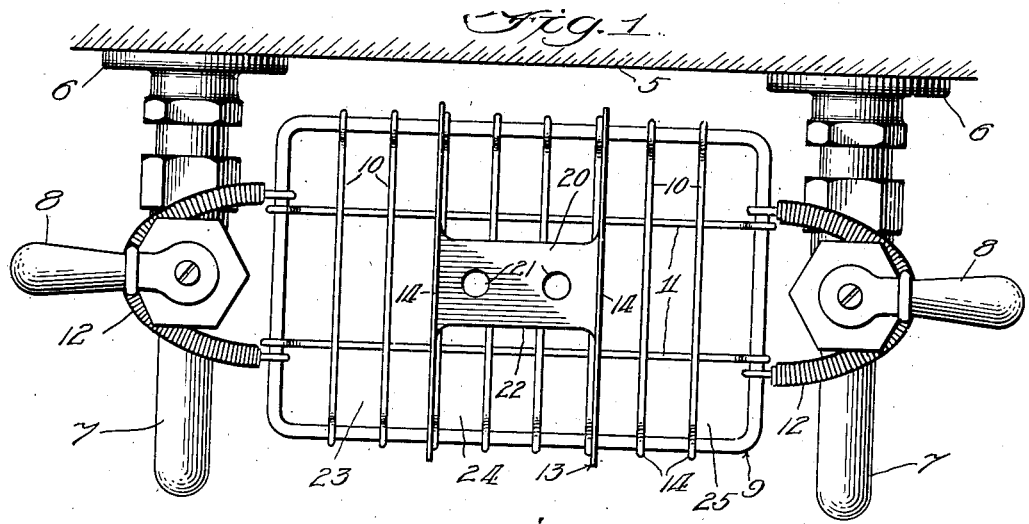
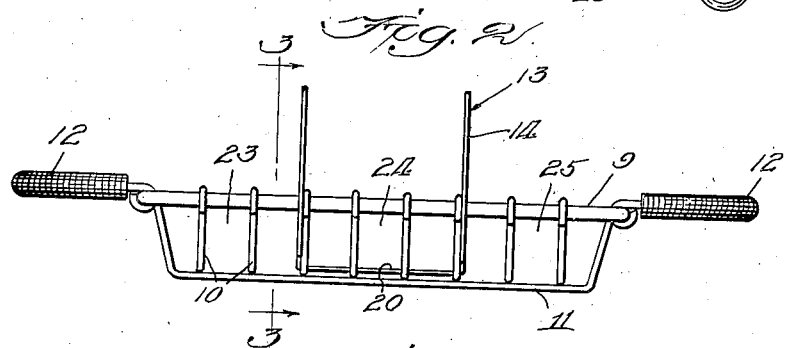
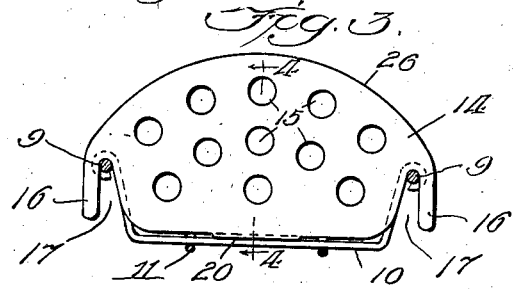
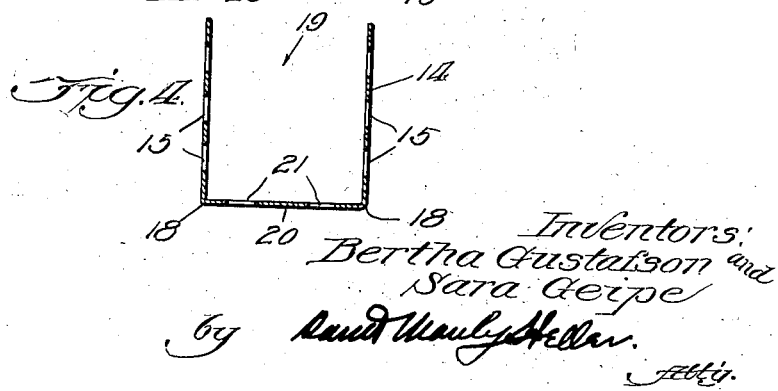
Inventors:
Bertha Gustafson and
Sara Geipe
by David Manly Heller
Atty.

Patented Dec. 30, 1941

2,268,392

UNITED STATES PATENT OFFICE 2,268,392

PARTITION DEVICE

Bertha Gustafson and Sara Geipe, Chicago, Ill.

Application February 5, 1940, Serial No. 317,330

3 Claims. (Cl. 220—22)

This invention relates to partitioning devices, and has for its primary object the provision of a simple structure which may be used to divide the cavity in a container into a multiplicity of smaller sections.

Another object of our invention is to provide a simple structure which will fulfill the requirements of dividing a compartment within a device into two or more sections depending on the positioning of our invention within the cavity of a container.

Another object of our invention is to provide locating means for firmly attaching and positioning our device within a pan, tray, or other similar receptacle.

Another object of our invention is to provide a practical, useful article which is cheap to manufacture in quantity production.

Other objects, features, and advantages of our invention will become apparent by reference to the accompanying drawing and the ensuing description wherein like symbols are used to designate like parts and in which;

Fig. 1 shows a top elevational view of our invention secured to a soap dish such as is commonly used in kitchens.

Fig. 2 shows a front elevation of our invention as represented in Figure 1.

Fig. 3 shows a longitudinal cross-sectional view on the line 3—3 of Figure 2.

Fig. 4 shows a longitudinal cross-sectional view on the line 4—4 of Figure 3.

Referring to the various views, shown on the drawing, it will be noted that Figure 1, shows a wall 5, from which emanate the faucet fittings generally designated 6 which are provided with spouts 7 and valve handles 8 which comprise the customary arrangement in a kitchen sink supplying hot and cold water.

The soap dish which is used commonly in kitchens for purposes of carrying various pieces of soap, such as hand soap, soap for cleaning dishes, steel wool etc., is illustrated and generally designated 9, which in this instance is rectangular in shape and made up of a wire construction being primarily made of a number of wires 10 and 11 arranged in transversal relationship, and hooked over the main body wire comprising the trap as indicated at 14. To this tray, are attached, in any suitable manner standard spring-like structures or other attaching means as indicated by 12 which are straddled across the two fittings 6 as indicated and preferably located in place over the faucets in order to hold the soap dish in position as indicated.

None of the items described thus far comprise our invention, our invention is comprised of the article generally designated as 13 in the view Figure 2, which is made up in U shaped formation as indicated in Figure 4, and is comprised of the side portions 14 and a lower portion 20 which is narrowed as indicated by the sides 22, the portion 14 may be arranged to be at right angles to the section 20 or at any other angle which may be found most suitable. In the preferred form we show the side portions 14 at right angles to the bottom portion 20.

The portions 14 are arcuately shaped at the top as indicated by the numeral 26 in order to eliminate sharp corners which might scratch the hand or fingers when reaching for a piece of soap which might be placed therebetween.

The arcuate portions 26 terminate in two toothed portions 15 which provide recesses 17 for locating our invention with respect to the top frame portion of a tray, pan, or other similar container, wherein the top frame portion 9 will fit within the recesses 17 as indicated, the invention being so constructed as to straddle opposite portions of the frame wire 9, or of such a similar edge of a pan or other culinary utensil.

In the present form shown, a series of holes 15 are shown in each of the portions 14, and similar holes 21 in the bottom portion 20 for purposes of providing drainage means when soap or other moist articles are placed within the tray 9 or the article comprising our invention designated 13.

As shown in the illustration Figure 2, when our invention 13 is placed in the center of a tray or pan, it provides three distinct compartments or sections as indicated in the view Figure 2 and designated 23, 24, and 25.

However, if it is desired to have only two compartments, the article 13 comprising our invention may be placed at either end of the tray 9 and thus it provides merely two compartments. The purpose of this is to enable one to more or less retain in an assorted manner the hand soap, dish cleaning soap, and the steel wool which may be used for cleaning pots and pans.

Without our invention it is necessary to pile the soap and the steel wool together, and the steel wool will scratch or abrade the soap and entangle therewith, thus causing a rather messy situation. With our invention, on the other hand, one can keep these items separately, the hand soap may be kept in compartment 23, the steel wool may be kept in 24, and the dish soap in compartment 25, thus it will permit of an orderly arrangement of those materials and keep them apart.

The device comprising our invention may be made of a single piece of material and may be metal or any other sheet material suitable for the purpose such as fibre or any laminated product suitable for bending and stamping, in which case looking at the views Figures 2 and 3, the portions 14 may be considered as opened flat to the horizontal level with the portion 20, and a die may be made to stamp out this article in that shape.

When the stamping is completed in which case all the recesses 15, 21, 17, and the lugs 16 will be stamped out, then by a second forming operation as indicated in the view Figure 4, the portions 14 are bent approximately at right angles at the point 18 thus providing the U shaped compartment 19.

One can readily see that our invention is comprised of a simple item which may be manufactured from very inexpensive material, cost of production could be very small, it requiring little work to stamp and form the item, after which it may be chromium plated, nickel plated, or if it is made of fibre, Celluloid, or Bakelite it would need no other finishing, but would be made of any color that the material is furnished usually in standard form when it is ordered.

We believe we have presented in rather succinct terms the nature, use, and application of our invention, also that we have represented graphically a preferred form thereof. Inasmuch as we believe that our invention is susceptible of many modifications, alterations, and improvements, we reserve the right to all such modifications, alterations, and improvements which come within the scope and spirit of our invention, the purview of the foregoing description, and the drawing showing a preferred form thereof. Our invention being limited only by the appended claims.

Having thus described our invention what we claim as new and desire to secure by Letters Patent is:

1. An article of the character described comprising, a substantially U shaped structure having open end portions, and two side portions provided with tray locating means, and a bottom portion substantially narrower than the base of said side portions, interconnecting the said side portions, the said tray locating means comprising, tooth portions emanating from the said side portions thus providing recesses adapted to straddle and fit slidably and removably over opposite edges of a tray.

2. An article of the character described comprising, a substantially U shaped structure having open end portions, and two side portions provided with tray locating means, and a bottom portion interconnecting the said side portions, the said tray locating means comprising, tooth portions, emanating from the said side portions thus providing recesses adapted to straddle and fit slidably and removably over opposite edges of a tray.

3. An article of the character described comprising, a substantially U shaped structure having open end portions, and two side portions provided with tray locating means, the said side portions further provided with portions extending above the said tray locating means, and a bottom portion, substantially narrower than the base of said side portions, interconnecting the said side portions, the said tray locating means comprising, tooth portions emanating from the said side portions thus providing recesses adapted to straddle and fit slidably and removably over opposite edges of a tray.

BERTHA GUSTAFSON.
SARA GEIPE.